(12) United States Patent
Bahlke

(10) Patent No.: US 12,485,634 B2
(45) Date of Patent: Dec. 2, 2025

(54) METHOD FOR VULCANIZING A TIRE

(71) Applicant: HARBURG-FREUDENBERGER MASCHINENBAU GMBH, Hamburg (DE)

(72) Inventor: Stefan Bahlke, Lüneburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 988 days.

(21) Appl. No.: 17/507,390

(22) Filed: Oct. 21, 2021

(65) Prior Publication Data

US 2022/0040945 A1 Feb. 10, 2022

Related U.S. Application Data

(63) Continuation of application No. 15/577,519, filed as application No. PCT/DE2016/000226 on May 25, 2016, now abandoned.

(30) Foreign Application Priority Data

May 28, 2015 (DE) ..................... 10 2015 007 201.3
Mar. 9, 2016 (DE) ..................... 10 2016 003 071.2

(51) Int. Cl.
  *B29D 30/06* (2006.01)
(52) U.S. Cl.
  CPC ......... *B29D 30/0601* (2013.01); *B29D 30/06* (2013.01); *B29D 30/0603* (2013.01); *B29D 30/0606* (2013.01); *B29D 30/0662* (2013.01)
(58) Field of Classification Search
  CPC .............. B29D 30/06; B29D 30/0601; B29D 30/0603; B29D 30/0606; B29D 30/065; B29D 30/0662; B29D 2030/0609; B29D 2030/0666; B29D 2030/0671; B29C 33/22; B29C 33/24
  USPC ........................................................ 425/28.1
  See application file for complete search history.

(56) References Cited

U.S. PATENT DOCUMENTS

| | | | |
|---|---|---|---|
| 1,871,160 A | 8/1932 | Denmire | |
| 1,895,296 A | 1/1933 | Shook | |
| 2,339,541 A | 1/1944 | Bosomworth | |
| 3,669,581 A | 6/1972 | Maurer | |
| 3,936,251 A | 2/1976 | Billey | |
| 4,130,384 A * | 12/1978 | MacMillan | ........ B29D 30/0649 425/451.2 |
| 4,212,605 A | 7/1980 | MacMillan | |

(Continued)

FOREIGN PATENT DOCUMENTS

DE 102014001643 A1 10/2014

OTHER PUBLICATIONS

Noria Corporation (Hydraulic Systems and Fluid Selection, Machinery Lubrication, Feb. 19, 2015, pp. 1-3). (Year: 2015).*

*Primary Examiner* — Sedef E Paquette
(74) *Attorney, Agent, or Firm* — LUCAS & MERCANTI, LLP; Klaus P. Stoffel

(57) ABSTRACT

A method for vulcanizing a tire with a tire vulcanization machine having closing force unit for the treatment space of the tire vulcanization machine. The closing force unit having a base plate and at least one linear drive for the displacement and force application of a mold pressure plate, wherein the at least one linear drive is an integral part of the base plate so that a compact and stringent structure of the closing force unit is supported.

15 Claims, 3 Drawing Sheets

(56) References Cited

U.S. PATENT DOCUMENTS

| | | | |
|---|---|---|---|
| 4,383,808 | A | 5/1983 | Kubo |
| 4,390,334 | A | 6/1983 | Singh |
| 4,453,902 | A | 6/1984 | Imbert |
| 4,563,139 | A | 1/1986 | Yokoyama |
| 4,631,014 | A | 12/1986 | Drewel |
| 4,813,861 | A | 3/1989 | Hasegawa |
| 4,921,412 | A | 5/1990 | Scantland |
| 4,927,344 | A | 5/1990 | Amano |
| 4,969,812 | A | 11/1990 | Brown |
| 5,194,267 | A | 3/1993 | Funakoshi |
| 5,271,727 | A | 12/1993 | Irie |
| 5,683,726 | A | 11/1997 | Mitamura |
| 5,759,587 | A | 6/1998 | Naoi |
| 5,820,886 | A | 10/1998 | Irie |
| 5,866,170 | A | 2/1999 | Fujieda et al. |
| 6,139,301 | A | 10/2000 | Elleder |
| 8,282,373 | B2 | 10/2012 | Fujieda |
| 10,357,929 | B2 | 7/2019 | Bahlke |
| 2015/0079210 | A1 | 3/2015 | Singh et al. |
| 2016/0001513 | A1 | 1/2016 | Bahlke |

\* cited by examiner

METHOD FOR VULCANIZING A TIRE

The present application is a Continuation Application of U.S. patent application Ser. No. 15/577,519, filed Nov. 28, 2017, which is a 371 of International application PCT/DE2016/000226, filed May 25, 2016, which claims priority of DE 10 2015 007 201.3, filed May 28, 2015, and priority of DE 10 2016 003 071.2, filed Mar. 9, 2016, the priority of these applications is hereby claimed and these applications are incorporated herein by reference.

BACKGROUND OF THE INVENTION

The invention relates to a method for vulcanizing a tire using a tire vulcanizing machine having a closing force unit for the treatment chamber of the tire vulcanization machine. The tire vulcanization machine further has a base plate and at least one linear drive for the displacement of and exertion of force on a mold pressure plate.

The production of a tire, for example for vehicles such as automobiles, heavy goods vehicles or motorcycles, is an extremely complex process made up of a multiplicity of production and process steps. A reason for this is the complex tire structure composed of a considerable number of different individual components. Furthermore, said multiplicity of components must be connected to one another under the action of pressure and temperature, through so-called vulcanization. The vulcanization process is likewise of significance with regard to the material and grip characteristics of the finished tire.

For this reason, one of the main production steps for the production of tires is the vulcanization of green tires to form a finished tire. For this purpose, the green tire is placed into a mold or tire mold which is situated within a tire vulcanization machine and which is subsequently heated to the material-dependent vulcanization temperature and charged with a vulcanization pressure at the inside of the green tire. To attain the vulcanization temperature and the vulcanization pressure, a suitable heating medium is introduced, with corresponding exposure to temperature and pressurization, into the interior space of the green tire.

The vulcanization basically has the aim of practically "baking" a green tire "into a finished state" by exposure to temperature and pressurization within one or more time intervals, that is to say connecting the components of the green tire to one another and imparting elastic characteristics to the base materials and to the rubber layer by cross-linking processes. For this purpose, aside from the actual pressurization and exposure to temperature, various additive substances adapted to the base material are also required for the cross-linking and possibly for accelerating the cross-linking.

To carry out a vulcanization of the elastomer material, a considerable quantity of heat energy must be introduced into the material. For this purpose, it is in most cases not sufficient for the green tire for vulcanization to be exposed to a vulcanization temperature, and pressurized with a vulcanization pressure, from the inside.

To realize the quantity of heat energy and pressurization required for the vulcanization process, provision is alternatively or additionally made for the green tire to be subjected to pressure and/or action of temperature at the outside of the green tire in the vulcanization machine. For this purpose, it is normally the case that a treatment chamber is installed, which is referred to as tire mold and which can be opened and closed such that the green tire for vulcanization can be placed in, vulcanized and removed.

Particularly thick regions of the green tire are the treads. The side walls are of relatively thin form. This considerable thickness difference arises owing to the additional tire components arranged in the region of the tread, such as steel belts, belt cover ply and the rubber layer which is considerably thicker than the side wall. Said considerably thicker rubber layer has a greater wall thickness not least because it comprises the tire profile itself, which is produced during the vulcanization process. For this purpose, the tread region, or the thick-walled rubber mass provided there, must be heated to such an extent that it can plastically flow and can be pressed by the vulcanization pressure into the profile negative die of the green tire mold of the tire vulcanization machine. The plastic flow capability increases over a broad range with increasing heating of the material, such that less pressing pressure is required to be able to reliably produce the profiling.

Following the general physical principle of omnidirectional pressure propagation, the treatment chamber, that is to say the tire mold, must support and accommodate the pressing and pressure forces both in a radial direction and in an axial direction. As a result, regardless of whether the tire mold longitudinally or transversely with respect to the axis of rotation of the tire for vulcanization, the movement devices for opening and closing the tire mold must normally not only impart the forces for moving at least one mold half but also be adequately dimensioned with regard to the closing forces during the tire vulcanization. Owing to the closing forces, which may reach several kN, use is normally made of high-pressure fluid cylinders in addition to mechanical solutions such as for example knee lever structures or spindles.

DE 10 2014 001 643 A1, for example, presents a tire heating press or tire vulcanization machine of frame-type construction with a functionally separate two-component solution with regard to the vertical positioning and the accommodation of closing force. It is disclosed that the adjustment of the height of the mold is realized by means of at least two double-acting hydraulic cylinders and at least one guide element, wherein the guide element has at least one position securing facility by means of at least one locking device and can thereby accommodate the closing forces.

To realize the adjustment of the height of the mold within the tire heating press, the height of at least one mold half is effected by means of at least two hydraulic cylinders. The introduction of energy is realized by means of the pressurized liquid volume flow in a known manner by virtue of said pressurized liquid volume flow being introduced into the fluid cylinder through feed lines.

The fluid cylinders are configured as separate, installation-ready units and are normally purchased parts. Owing to the considerable longitudinal extent of installation-ready fluid cylinders, said components must be arranged within the machine bed and have an adverse effect on, that is to say increase, the structural height of the machine frame and the tire vulcanization machine as a whole.

The teaching of DE 10 2014 001 643 A1 combines the fluid cylinders for the adjustment of the height of the mold of a tire heating press with at least one guide element. Said guide element is preferably mounted centrally with respect to the height-adjustable mold halves and/or centrally with respect to the fluid cylinder arrangement and designed for accommodating radial and axial forces. With the use of the at least one guide element, the radial forces are not introduced into the fluid cylinder, and damage, for example leaks, is/are prevented.

The guide element is furthermore equipped with a locking device. Said locking device enables the entire structural element composed substantially of the fluid cylinders, the mold half and the guide element fixed to the mold half to be fixed in an axial-linear movement direction. It is achieved in this way that, after the fluid cylinders have adjusted the mold half into the desired height position and the locking device has been activated, the fluid cylinders can be switched into an unpressurized state. This means that the linear forces in an axial direction that act within the press during the tire production process, that is to say the closing forces themselves, are accommodated not by the fluid cylinders but by the guide element.

Another solution consists in the closing forces being accommodated not by a guide element but rather directly via the fluid cylinders, without the use of a guide element. In this case, however, the fluid cylinders must be designed for the very high closing forces. Furthermore, the occurring radial forces must be accommodated by the piston rods and piston-rod guides of the fluid cylinders.

Both design variants for realizing the accommodation of the closing forces are basically usable both in frame-type presses and in column-type presses or in tire vulcanization machines constructed on stands, but in any case require correspondingly adequate dimensioning.

The known closing force units have numerous disadvantages which may exist both individually and collectively. Although fluid cylinders which can be purchased as installation-ready units are in themselves inexpensive, the outlay in terms of construction for integration into the tire vulcanization machine, and the resulting increased machine structural height, are however considerably expensive and elaborate.

Furthermore, forces acting radially on the fluid cylinders can have a highly adverse effect on, that is to say can shorten, the service life and/or the sealing action thereof. Purchasable fluid cylinder structural units are normally not suitable and designed, or are suitable and designed only to a limited extent, for absorbing radial forces. The higher costs resulting from the construction of a radial force accommodating device that is required as a result increase the general outlay in terms of construction, and can impede or adversely affect the accessibility to the press elements in said region.

A further problem may arise from the fact that the fluid cylinder structural units are generally accommodated within the machine bed. The receiving bores, leadthrough openings and fastening means and partially required cutting-out of reinforcement ribs have the effect of reducing strength with regard to the overall structure, and can result in increased deformation of the load-bearing unit.

SUMMARY OF THE INVENTION

A problem addressed by the invention is that of providing a method for vulcanizing a tire using a closing force unit for tire vulcanization machines which at least partially reduces the stated disadvantages and supports an inexpensive overall construction.

To solve said problem, the teaching according to the invention proposes that at least one fluid cylinder is formed as an integral constituent part of the tire vulcanization mold and/or of the machine components.

As an approach to a solution, it is provided that the fluid cylinder composed of piston and possibly piston rod and cylinder housing is not introduced as a separate purchased part, with provision rather being made for a fluidic linear drive to be constructed integrally in the base plate of the tire vulcanization machine.

The integral design is realized by the invention through the direct utilization of the base plate as a cylinder housing. For this purpose, bores are formed into the base plate in accordance with the required number of fluidic linear drives, which bores may, depending on the embodiment of the fluidic linear drive, be formed as passage bores and/or as blind bores. In this way, both piston-piston rod linear drives and also piston-type linear drives based on the plunger cylinder principle can be integrated.

In a preferred embodiment, the invention provides linear drives based on the plunger cylinder principle integrated into the base plate. For this construction, blind bores are provided in the base plate, which blind bores correspond in terms of their bore diameters to the respectively used piston and provide a clearance fit which supports linear mobility of the piston in the bore. The pistons or blind bores may have sealed devices such as for example bushings, piston rings, stripper rings or Simmerrings in order to reduce the escape of fluid from the concentric ring-shaped movement gap between piston and blind bore.

In particular, the linear drives integrated into the base plate have considerable advantages in relation to known closing force units:

Through the utilization of the base plate as a cylinder for the pistons, separate cylinders are not required and thus save costs, and furthermore the structural space situation is advantageous from numerous aspects simultaneously in that both a reduced overall machine height and the compact piston arrangement and an optimally utilizable base plate surface are supported, owing to the sealed piston arrangement, very uniform and homogeneous introductions of closing force into the tire mold are possible, the machine bed can be designed optimally from a strength aspect without the receiving spaces and bores for fluid cylinders, the available piston surfaces can realize considerable closing forces even without fluid pressures in the high-pressure range, such that expensive and energy-intensive high-pressure apparatuses for the build-up of fluid pressure can be omitted, and operation in the low-pressure range below 100 MPa, preferably at approximately 40 MPa, is supported, the time required for the build-up of the closing force is minimized, the large piston diameters of the linear drives support the accommodation of radial forces, the considerably large piston surfaces of the solution according to the invention result in a reduced contact pressure between the respective piston face surface and the mold pressure plate or the tire mold, such that the temperature insulating means required at these locations are subjected to lower mechanical load, with the result that a less expensive material and/or a material with improved insulation capabilities can be used for the temperature insulation means, and the energy efficiency of the tire vulcanization machine as a whole is increased owing to the resulting reduced heat energy losses.

By means of the construction according to the invention of the closing force unit with linear drives integrated into the base plate, cost savings can be achieved which amount to up to 70% of the costs of similar solutions with separate linear drives in the form of purchased parts. For the integration of the linear drives into the base plate, it is envisaged that the plate thickness of said base plate be increased by up to 150%, such that a thickness of approximately 250 to 300 mm is realized.

As a result of the integration of the at least one linear drive as a functional constituent part of the base plate, a compact stringent structure of the closing force unit is realized according to the invention, which as a result offers considerable cost saving potential and has the stated functional improvements.

BRIEF DESCRIPTION OF THE DRAWING

One of the possible embodiments of the closing force unit used in the method for vulcanization of a tire using a tire vulcanization machine, having at least one linear drive integrated into the base plate, is illustrated in figures, in which.

DETAILED DESCRIPTION OF THE INVENTION

Figure 1:
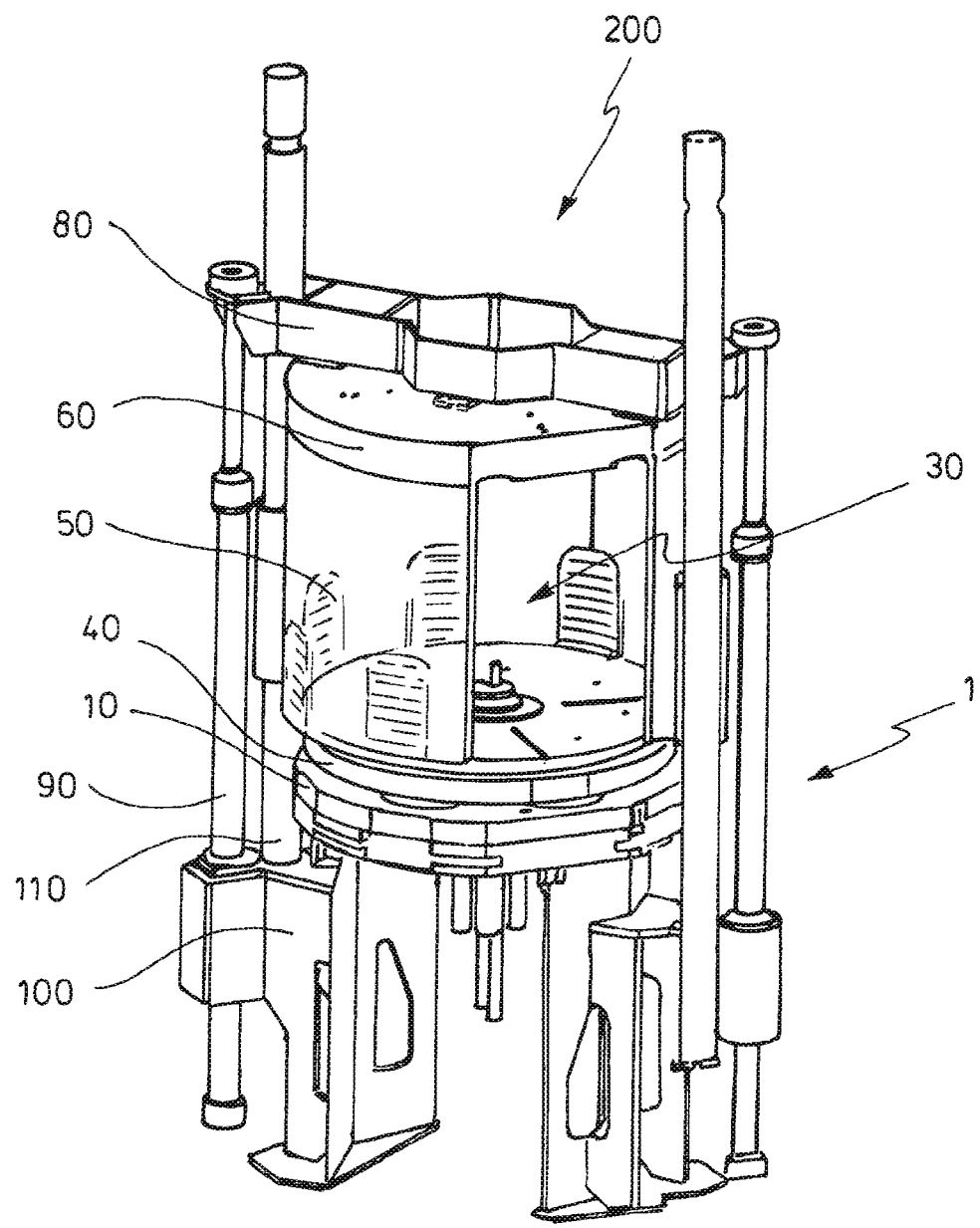
FIG. 1 shows an exemplary embodiment of the closing force unit (1) according to the invention for tire vulcanization machines (200) in a perspective overall illustration of the tire vulcanization machine (200) with a partial section in the x-z plane.

FIG. 1 illustrates a tire vulcanization machine (200) with an exemplary embodiment of the closing force unit (1) according to the invention in a three-dimensional overall view. The tire vulcanization machine (200), which is also referred to as tire heating press, is in this example constructed as a column-type press and, in its load-bearing overall construction, has a machine bed (100) with columns (110), a crossmember (80) and a base plate (10).

If the tire heating press is constructed for example as a frame-type or stand-type press, the closing force unit (1) may be integrated into the machine frame or, as in the case of the column-type construction shown in FIG. 1, into a base plate (10). In this way, the closing force unit (1) according to the invention can be realized independently of the type of construction of the press and in any desired tire vulcanization machine (200).

A functional core element of the tire vulcanization machine (200) is the treatment chamber or the vulcanization chamber/tire mold (30), the spatial extent of which is delimited by the mold pressure plate (40) and by the mold counterpressure plate (60) and by a preferably cylindrical tension casing (50). Aside from the delimitation of the vulcanization space (30), the tension casing (50) is assigned two further functional tasks: owing to the pressure forces within the vulcanization chamber (30) during the vulcanization of the green tire, the tension casing (50) accommodates the resultant (tensile) forces in an axial direction, and has an insulating action with regard to the vulcanization temperatures of up to 160 degrees Celsius, in some cases even higher, which prevail in the vulcanization chamber (30).

The mold pressure plate (40) can be linearly axially both displaced and also subjected to force, both being introduced into the mold pressure plate (40) by the closing force unit (1), such that a pressing force can be built up in the vulcanization chamber (30) and the volume thereof can be set. The mold counterpressure plate (60) practically constitutes the counterbearing, with respect to the mold pressure plate (40), for the closing and pressing forces, wherein the tension casing (50) produces the force-transmitting connection between the plates (10, 40, 60).

The tension casing (50) is preferably fixed to the mold counterpressure plate (60) and axially movable as a common structural unit. The mold counterpressure plate (60) is guided together with the tension casing (50), via a crossmember (80), by two columns (110). The axial movement drive for the structural unit of mold counterpressure plate (60) with tension casing (50) is realized by means of two fluid cylinders (90) which produce an operative connection of crossmember (80) to machine bed (100) and which are preferably of double-acting form.

Figure 2:
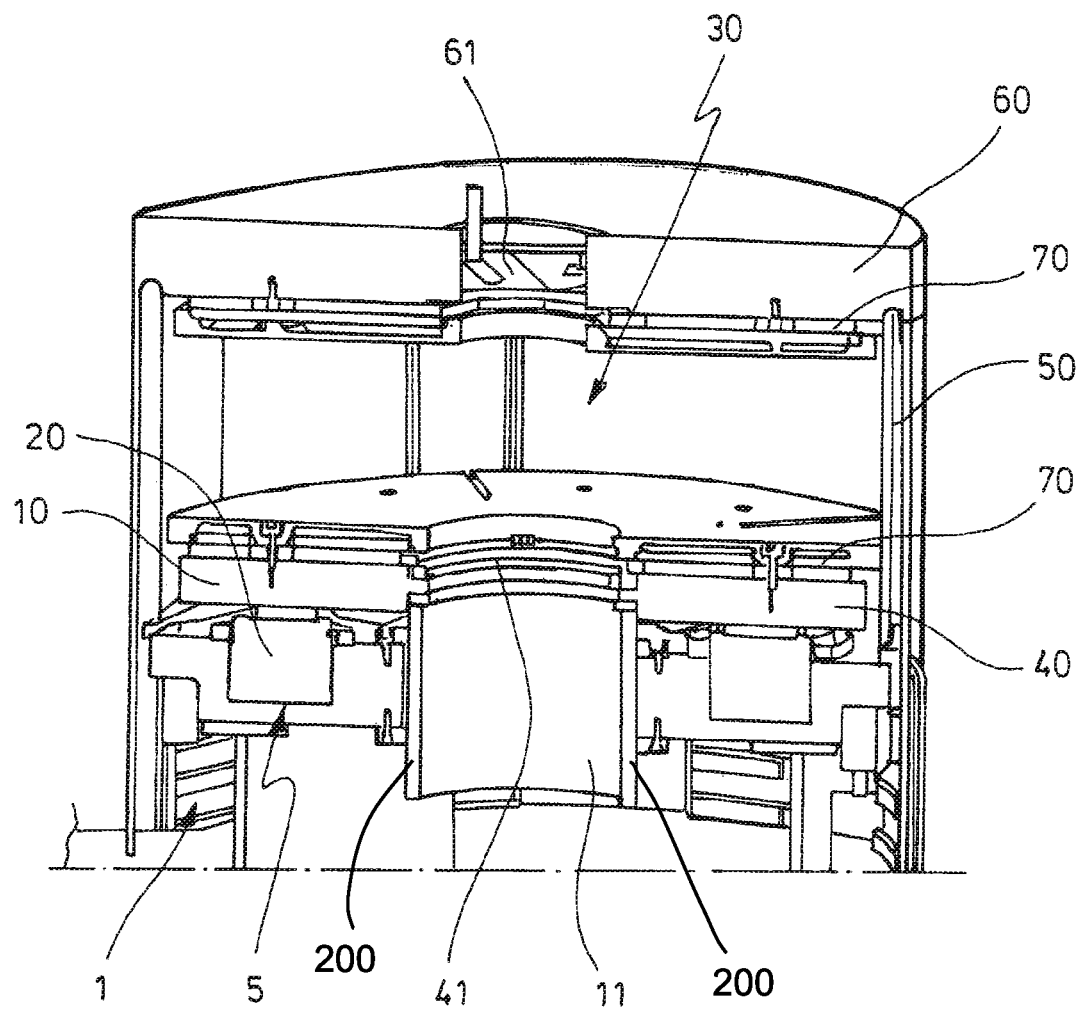
FIG. 2 shows the perspective sectional illustration of the vulcanization chamber or of the tire mold (30) with closing force unit (1)

FIG. 2 shows, in a perspective sectional illustration, the region of the vulcanization chamber (30). Essential constituent parts of the vulcanization chamber (30) are the mold pressure plate (40), the mold counterpressure plate (60) and the tension casing (50). Optional adapter plates (70) may be provided for fixing tire mold halves to the mold pressure plate (40) and/or to the mold counterpressure plate (60).

The closing force unit (1) is positioned adjacent to the vulcanization chamber (30) such that both the closing force and the axially directed displacement travel can be introduced into the mold pressure plate (40). The example shown in FIG. 2 realizes the positioning of the closing force unit (1) adjacent to the treatment chamber (30) by means of the concentric position vertically below the mold pressure plate (40).

If devices for internal pressurization and applying heat energy to the green tire to be vulcanized are required in the tire mold or the vulcanization chamber (30), passage regions (11, 41, 61) may be provided for the leadthrough of the mechanical components. The passage region (11) is formed by a vertically extending pipe (200).

To realize the closing force unit (1) according to the invention in the embodiment and arrangement example shown, at least one piston (20) is arranged in the base plate (10) such that said piston, as an integrated linear drive (5), can displace and exert force on the mold pressure plate (40). It is particularly advantageous for multiple pistons (20) to be used in a manner distributed symmetrically or asymmetrically on the face side of the base plate (10). It is possible for four or more pistons (20) to be installed such that, firstly, the available base plate area is optimally utilized, and/or a highly uniform contact pressure and introduction of force can be introduced by the multiple pistons (20) into the mold pressure plate (40), and/or the axially linear displacement can be introduced substantially uniformly into the mold pressure plate (40), and in this way, misalignment or tilting of the base plate (10) during the displacement is reduced, and/or a large effective total piston surface area is provided across the pistons (20) used, such that a reduced contact pressure prevails between the respective piston face surfaces and the mold pressure plate (40), and the temperature insulation means required at said locations are subjected to lower mechanical load, and/or even the low pressure range of the fluid results in adequately high pressing forces.

Figure 3:
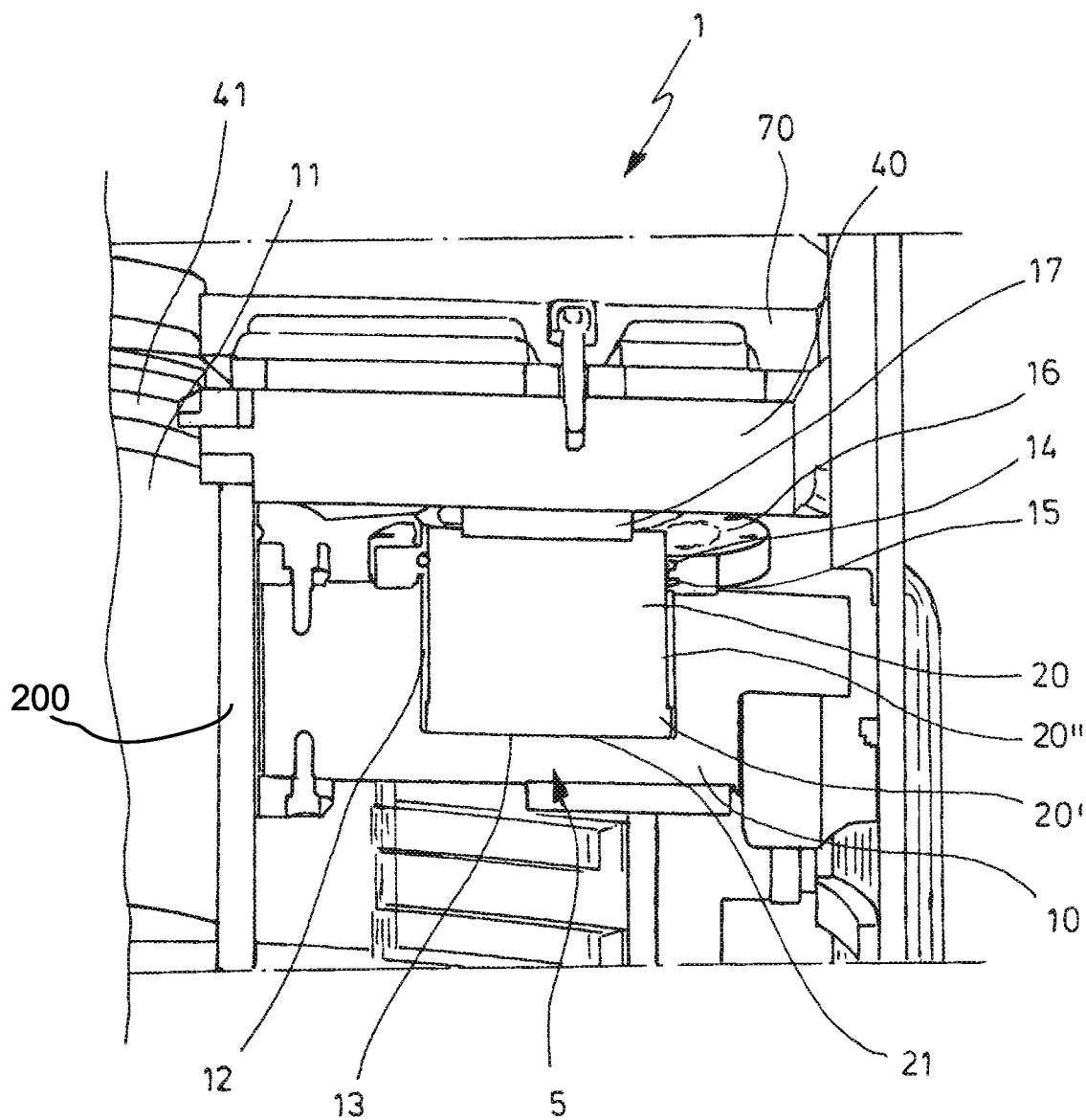
FIG. 3 shows the perspective sectional illustration of the closing force unit (1) in a detail view.

FIG. 3 shows the exemplary embodiment of the closing force unit (1) from FIG. 1 and FIG. 2 in a perspective sectional illustration. The base plate (10) is equipped with each case one blind bore (12) for accommodating the piston (20). The bore diameter realizes a clearance fit with the piston diameter, such that the piston (20) is displaceable in its axial direction in the blind bore (12) when a fluid, such as for example water or hydraulic oil, is introduced into the fluid chamber (13). The fluid chamber (13) is defined and delimited at the base plate side by the blind bore base and by the bore wall, and the piston crown (21) as a displaceable element closes off the fluid chamber (13) with a thereby variable volume.

As an alternative to the blind bore (12) shown in FIG. 3, the piston receptacle in the base plate (10) may also be realized by a passage bore which is closed off on one side by a plate after the production process. In this case, the fluid chamber (13) is defined and delimited by the plate and by the bore wall.

To introduce the fluid into and/or discharge said fluid from the fluid chamber (13), the invention provides at least one opening in the base plate (10), which opening is preferably formed as a bore at the blind hole base (not shown) and supports the connection to a fluid apparatus. Alternatively or in addition, the at least one opening may be arranged on the bore wall or on the piston (20).

Owing to the considerable utilizable piston surfaces, the closing forces that result from the contact pressures may, even in the case of fluid pressures in the low pressure range, be high enough that the fluidic linear drives (5) and fluid apparatuses do not have to be realized in the expensive high-pressure variants.

According to the invention, the piston construction may be realized optionally as a plunger-type piston or as a piston-piston rod unit.

In terms of geometry, the plunger-type piston is a prismatic, preferably cylindrical piston with a continuous shell without a shoulder. In other words: the plunger-type piston has no piston rod, and the piston extends over the entire axial length and functionally also performs the task of the piston rod. Owing to this design, the plunger-type piston can be produced very easily and, together with the receiving bore in the base plate (10), forms a clearance fit gap which, owing to its very large meridian length, both has excellent sealing characteristics and guides the plunger-type piston in a very exact manner.

The piston structure of the piston-piston rod unit has a piston region (20') and a piston rod region (20") with an interposed shoulder in the form of a concentric diameter step. The diameter in the piston region (20') is larger than the diameter in the piston rod region (20"), such that only the meridian length of the piston region (20') forms a clearance fit gap together with the receiving bore (12) in the base plate (10). Owing to the second fluid chamber which is thus formed and which is bordered by the bore wall, the concentric diameter step and the outer wall of the piston rod region (20"), the linear drive (5) can be of double-acting design.

To reduce the escape of fluid from the clearance fit gap, the invention provides at least one seal (14), assigned in each case to a linear drive (5) of the closing force unit (1). The seal (14) may for example be an O-ring or a Simmerring. Furthermore, a stripper ring (15) may be provided which interacts with the seal (14).

The positioning of the seal (14) and of the stripper (15) may be realized in a variety of configurations: in the example shown, a ring (16) is reversibly fixed to the base plate (10) at the piston outlet side of the bore (12) and is equipped, on the inside, with corresponding ring-shaped grooves for receiving the seal (14) and the stripper (15). If no ring (16) is used, the grooves, and thus the positioning of the seal (14) and the stripper (15), may be arranged for example within the bore (12) and/or in the piston side surface.

The ring (16) may optionally have further structural and functional features. For example, a collar may be formed thereon, which collar projects into the bore (12) and is formed as a bushing. Furthermore, the ring (16) may functionally act as a stop with the shoulder of the piston (20) between the piston region (20') and the piston rod region (20") and thereby limit the linear deployment movement of the piston (20).

On the face side of the piston (20) and adjacent to the mold pressure plate (40), there is normally a need for temperature insulation measures for reducing the heat transfer into the at least one piston (20) and base plate (10) from the vulcanization chamber (30).

Owing to the very large piston face surface provided by means of the teaching according to the invention, and the altogether large contact surfaces of the multiple pistons (20) that are preferably used, the contact pressure that acts on the contact surfaces is relatively low, despite high closing forces that can be realized by the closing force unit (1). The reduced contact pressure in said regions supports the use of temperature insulation elements (17) with low compressive strength characteristics. As a result, use may be made of insulation materials which are less expensive and/or exhibit improved insulation characteristics.

The temperature insulation elements (17) may, by means of different thicknesses, simultaneously be utilized for compensating shape and dimensional tolerances and thereby leveling height differences in the case of multiple linear drives (5) being used.

The invention claimed is:

1. A method for vulcanizing a tire with a tire vulcanization machine, wherein the tire vulcanization machine comprises: a treatment chamber; and a closing force unit for the treatment chamber, the closing force unit including: a base plate; and at least two linear drives for displacement of and exertion of force on a mold pressure plate, wherein the at least two linear drives are an integral constituent part of the base plate, so as to provide a compact structure of the closing force unit, wherein the at least two linear drives are cylinders each with a piston that is received in movable fashion in a blind bore of the base plate, wherein the base plate is arranged in a lower part of the tire vulcanization machine and at least one lower mold part is arranged on the mold pressure plate, wherein the mold pressure plate extends horizontally and has surfaces directed vertically upwards and downwards, wherein the mold pressure plate is movable in a vertical direction by the pistons, wherein the pistons are arranged to generate a closing force in an upward direction to press the lower mold part against an upper mold part, wherein the base plate extends horizontally and has surfaces directed vertically upwards and downwards, the base plate having at least two blind bores that extend from an upper surface of the base plate in a vertical, downward direction, one piston being arranged in each of the blind bores and seals being arranged in the base plate beneath the pistons, wherein the cylinders are provided by the base plate, the base plate having at least one channel through which a fluid is conducted to a fluid chamber for movement of the pistons, the fluid chamber being arranged between a bottom of the blind bores and the pistons, wherein the upper mold part is arranged under a mold counter-pressure plate, the mold counter-pressure plate extends horizontally and has surfaces directed vertically upwards and downwards, wherein the channel for the fluid in the base plate is connected to a hydraulic pressure supply that provides a hydraulic pressure of at most 100 MPa, and wherein the treatment chamber is bounded by a cylindrical tension casing that is arranged to support tensile forces in an axial direction, wherein the tension casing provides a force-transmitting connection between the base plate and the counterpressure plate, and wherein the tension casing is fixed to the counterpressure plate, the method comprising a sequence of the following steps:

(A) opening the treatment chamber;
(B) loading a pre-fabricated tire into the treatment chamber;
(C) closing the treatment chamber;
(D) applying a pressure to the interior of the tire using pressurized fluid and the closing force unit;
(E) heating the tire to a vulcanization temperature to affect vulcanization of material of the tire; and
(F) unloading the vulcanized tire out of the treatment chamber.

2. The method according to claim 1, wherein the piston is a plunger piston.

3. The method according to claim 1, wherein the piston is a piston-piston rod combination having a piston region and a piston rod region.

4. The method according to claim 3, wherein a transition between the piston region and the piston rod region is formed by a concentric diameter step.

5. The method according to claim 1, wherein the bore and the piston are formed so that a clearance fit gap is realized between them, so that the piston is received in movable fashion in the bore of the base plate.

6. The method according to claim 5, wherein the clearance fit gap is a concentric ring-shaped gap.

7. The method according to claim 5, further comprising reducing an escape of fluid from the clearance fit gap by assigning at least one seal to the linear drive.

8. The method according to claim 7, wherein the at least one seal is an O-ring or a shaft seal.

9. The method according to claim 5, further comprising wiping fluid from a region of a wall of the piston that extends from the bore with at least one wiper assigned to the linear drive.

10. The method according to claim 7, including assigning the at least one seal to a wall of the piston and/or to a wall of the bore and/or to a ring fixed to the base plate at a piston outlet side of the bore.

11. The method according to claim 9, including assigning the at least one wiper to a wall of the piston and/or to a wall of the bore and/or to a ring fixed to the base plate at a piston outlet side of the bore.

12. The method according to claim 1, wherein the fluid chamber is defined and delimited at a base plate side by walls of the bore, and the piston has a crown as a displaceable element that closes off the fluid chamber with a thereby variable volume.

13. The method according to claim 12, wherein the fluid is a hydraulic oil or water.

14. The method according to claim 1, wherein the hydraulic pressure is 40 MPa.

15. The method according to claim 1, including arranging a thermal insulation element on a face side of the pistons.

* * * * *